June 22, 1943.   R. P. LOWE   2,322,373
TELEMETRIC CONTROL APPARATUS
Original Filed Jan. 15, 1938   3 Sheets-Sheet 1

RUDY P. LOWE
INVENTOR

BY Maxwell Barus
ATTORNEY

Rudy P. Lowe
INVENTOR

Patented June 22, 1943

2,322,373

UNITED STATES PATENT OFFICE 2,322,373

TELEMETRIC CONTROL APPARATUS

Rudy P. Lowe, Cranston, R. I., assignor to Builders Iron Foundry, Providence, R. I., a corporation of Rhode Island Original application January 15, 1938, Serial No. 185,181. Divided and this application December 6, 1939, Serial No. 307,764

3 Claims. (Cl. 221—118)

This invention relates to telemetric apparatus. An object of the invention is the provision of a novel means for controlling a dependent quantity, such as the rate of delivery of a substance, in accordance with a master quantity, such as a set rate or the rate of delivery of another substance. A more specific object is to provide a novel apparatus adapted for the effective and accurate control of the delivery of a substance in response to signals corresponding to the weight of material passing over a conveyor type scale.

Other features and advantages of the invention will be hereinafter described and claimed.

The present application is a division of my application Serial Number 185,181, filed January 15, 1938, now Patent No. 2,261,655.

In the accompanying drawings, Figure 1 is a diagrammatic view illustrating an embodiment of the invention in which the rate of delivery of a substance is controlled to a desired proportion to the rate of delivery of another substance.

Figure 1:
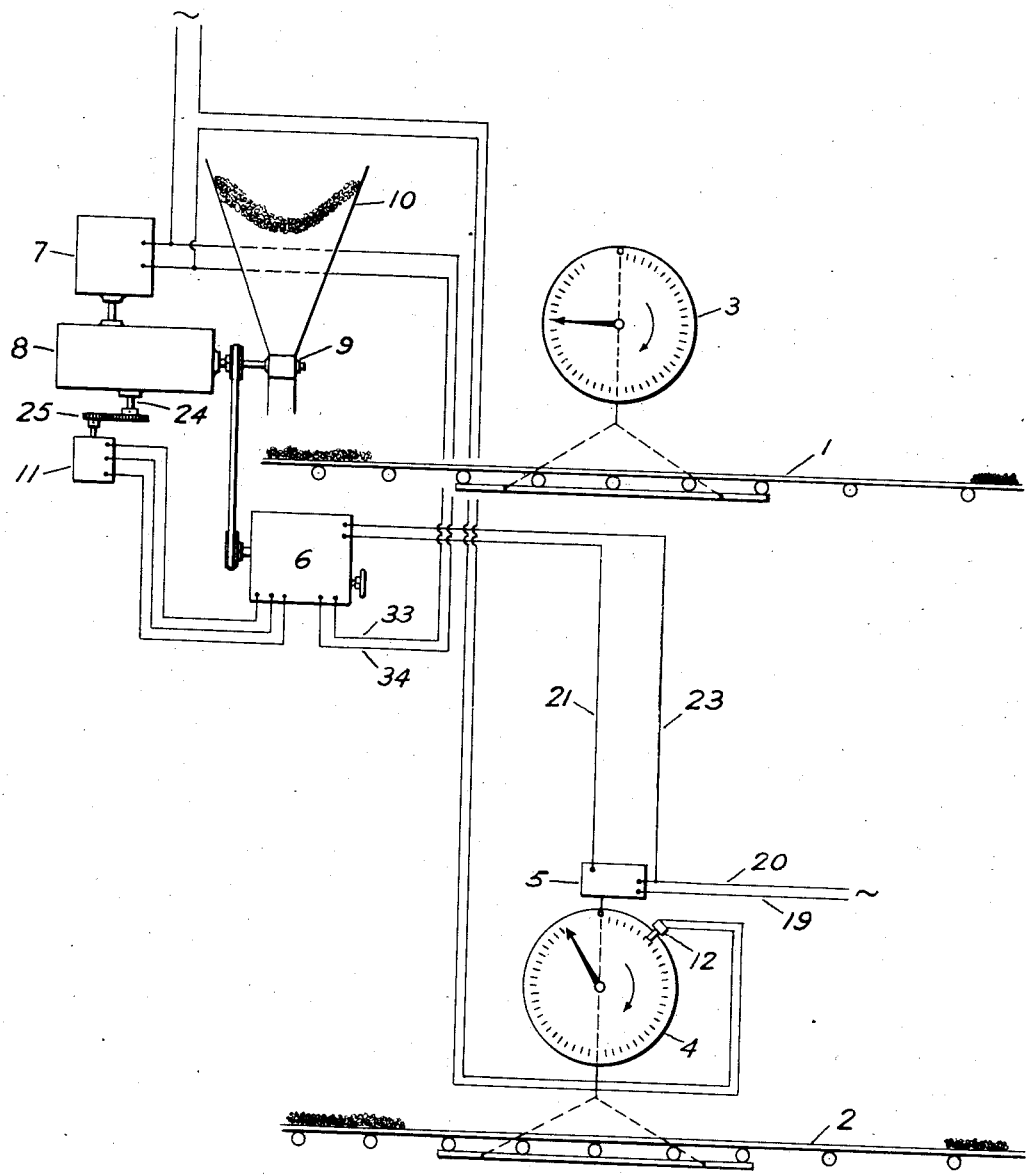

Referring to the drawings, there is shown in Fig. 1 a schematic layout of the main units of one embodiment in which the flow of material on the continuously traveling endless belt 1 is considered the dependent quantity to be controlled to a desired proportion to a master quantity, which, in this instance, is the flow of material on the continuously traveling endless belt 2. Scale 3 of well-known design measures the weight of material on a section of belt 1 and scale 4, similarly of well-known design, measures the weight of material on a section of belt 2. Connected to scale 4 and positioned thereby is a telemetric transmitter 5 which cyclically sends electrical impulses to a differential speed controller 6.

Motor 7 drives a conventional variable speed device 8 which operates a feeding device 9 for supplying material from hopper 10 to the belt 1. The differential speed controller 6 is itself controlled jointly by the output speed of device 8 and telemetric impulses from transmitter 5. The differential speed controller 6 controls the operation of reversible motor 11, which in turn regulates the speed ratio between motor 7 and feeder 9 in a well-known manner.

Underload limit switch 12 on scale 4 stops motor 7 and differential speed controller 6 when the load on scale 4 falls below the normal operating range. It is understood that other supplementary controls well-known in the art may be applied such as switches to stop various parts of the system if either belt drive fails or if the load on either belt becomes excessive or if the supply of material for either belt fails.

Figure 2:
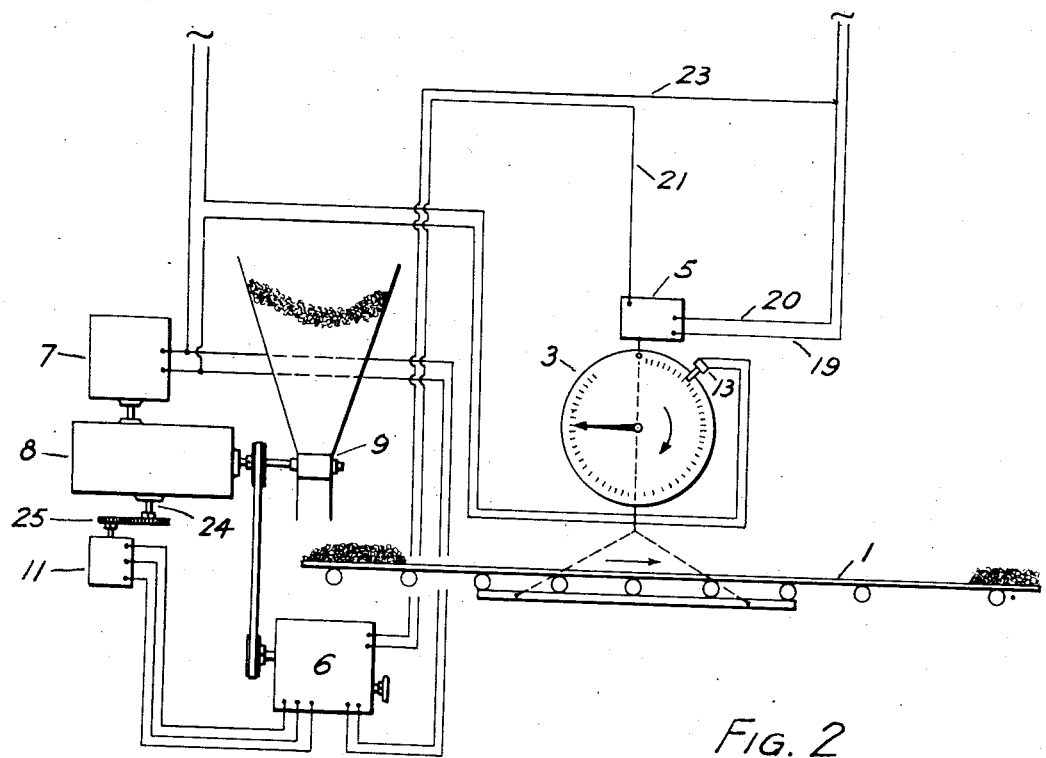
Figure 2 is a diagrammatic view showing an embodiment wherein the rate of delivery of a substance is controlled in accordance with a set rate.

In Figure 2 a continuous and constant rate of flow of material on belt 1 is maintained by controlling the speed of feeder 9. Scale 3 measures the weight of material on a section of belt 1. Connected to scale 3 and positioned thereby is telemetric transmitter 5 which cyclically sends to differential speed controller 6 electrical impulses of time duration corresponding to the weight on scale 3. Motor 7 drives variable speed device 8 which operates a feeding device 9 for the material on belt 1. Differential speed controller 6 is controlled jointly by the output speed of device 8 and the telemetric impulses from transmitter 5. The differential speed controller 6 controls the operation of reversible motor 11, which in turn regulates the speed ratio between motor 7 and feeder 9 in a manner well known in the art.

Underload limit switch 13 on scale 3 stops motor 7 and differential speed controller 6 when the load on scale 3 falls below the normal operating range. Other supplementary controls may be applied as described under Fig. 1.

Figure 3:
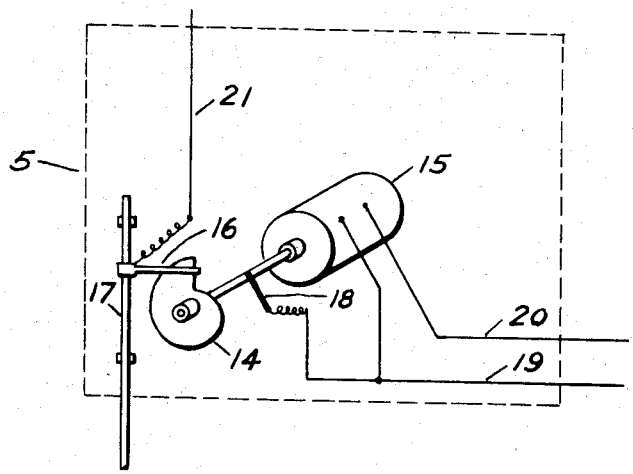
Figure 3 is a diagrammatic view illustrating a form of a transmitter which may be employed in my telemetric control system.

Fig. 3 illustrates a form of transmitter 5 which may be employed. Said transmitter comprises a cam 14 which is continuously rotated at constant speed by synchronous motor 15. Coacting with cam 14 is a contact 16 mounted on an element 17 which is connected to scale 3 of Figure 2, or to scale 4 of Figure 1, to be positioned in accordance with the net load on said scale. Said scale may be of a well-known type wherein the tare or empty belt weight is automatically eliminated in the arrangement of the scale levers, so that the relative position of element 17 and contact 16 with cam 14 is proportional to the net weight, i. e., the weight of the material on the belt. Cam 14 is connected by brush 18 to one of a pair of wires 19, 20 which lead from a suitable source of electrical energy. When contactor 16 engages cam 14, a circuit is completed from wire 19 through brush 18, cam 14 and contactor 16 through wire 21 which leads to the differential speed controller 6. Specifically, a circuit is closed by way of said cam, contactor, and wire 21, through a solenoid 22 (Fig. 4), in said differential speed controller, and thence through wire 23 to wire 20. Thus in each cycle of rotation of the transmitter cam 14 a circuit is closed through said solenoid for an interval proportional to the net weight of the material on that portion of the conveyor that is on the scale 3.

As previously noted, the driving motor 7 constitutes the input to a variable speed device 8 of conventional type, the output of which operates the feeder 9 or any other apparatus desired to be controlled. The ratio of input speed to output speed of the variable speed device 8 can be regulated, as is well understood in the art, by adjustment of shaft 24. The latter is driven through gearing 25 by reversible motor 11. On the output shaft of variable speed device 8 is a sprocket 26 which is connected by chain 27 to a sprocket 28 on shaft 29 of the differential speed controller 6. Also attached to shaft 29 is a gear 30 which forms one-half of a differential for driving the pinion 31 journaled on a shaft 31', which in turn is journaled on shaft 29. Synchronous motor 32 is connected to a source of electrical energy through wires 33, 34, and is slidably mounted on ways 35. Said motor 32 may be shifted to different positions along said ways by manual adjustment of screw 36. Attached to the shaft of motor 32 is a disk 37 which drives a wheel 38 attached to shaft 39 to drive said shaft in the opposite direction to that of shaft 29. Also on shaft 39 is a clutch member 40 adapted to engage a slidable clutch member 41 splined to shaft 42. Secured to shaft 42 is a gear 43 forming the other half of the differential for driving the pinion 31. Member 41 is normally held disengaged from member 40 by means of spring 44 attached to arm 45. The previously mentioned solenoid 22, in circuit with cam 14 and contactor 16 of transmitter 5, is adapted when energized to attract the arm 45. When the telemetric signals from the transmitter energize solenoid 22, arm 45 is attracted thereto, which causes engagement of member 41 with member 40 to drive gear 43 at a speed determined by the relative position of disc 37 with wheel 38. A resilient extension 46 of shaft 31' carries contact 47 which is connected to a source of electrical energy through wire 33. Contact 47 is adapted to engage contact 48 or contact 49 according to the direction of movement of shaft 31'. Contact 48 is connected to motor 11 by wire 50 and contact 49 is connected to motor 11 by wire 51. The common terminal of motor 11 is connected to a source of electrical energy through wires 52 and 34. Engagement of contact 47 with contact 48 causes rotation of motor 11 in one direction and engagement of contact 47 with contact 49 causes rotation of motor 11 in the opposite direction.

Figure 4:
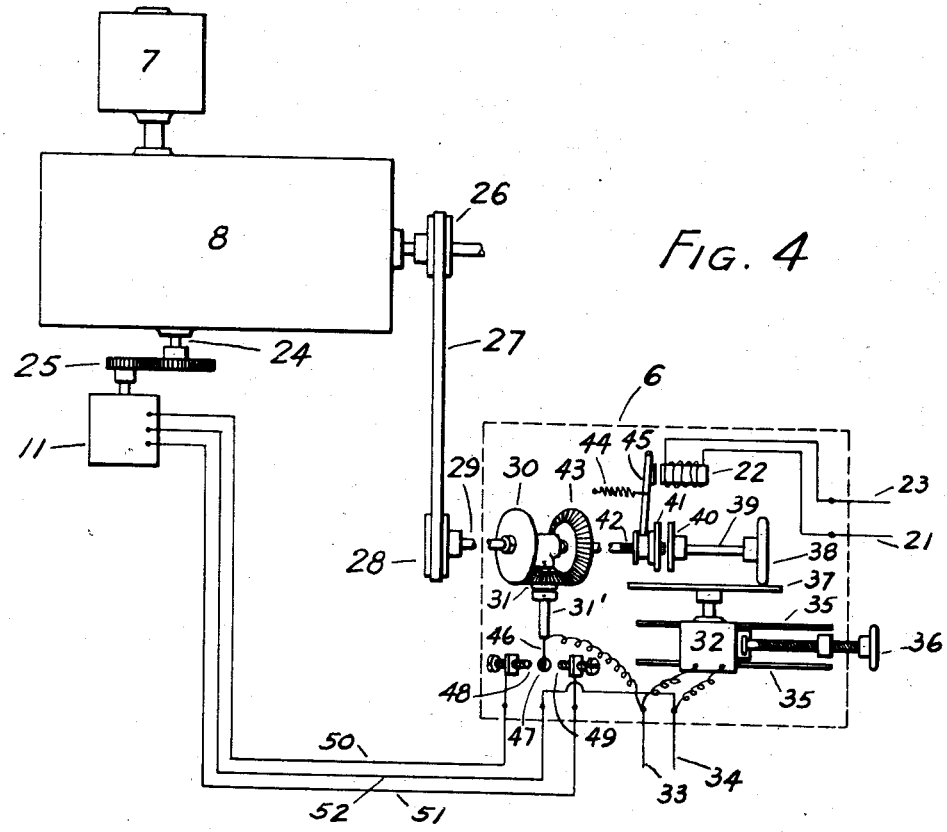
Figure 4 is a view illustrating an embodiment of a means responsive to transmitter signals for controlling the rate of delivery of a substance in my control system.

The operation of the apparatus shown in Fig. 4 is as follows: Gear 30, which is driven at a speed proportional to the rate of feeding of the variable speed drive 8, tends to cause contact 47 to engage, for example, contact 48. Gear 43, which is driven in the opposite direction to gear 30 by being connected intermittently to synchronous motor 32, tends to cause contact 47 to engage contact 49. Contacts 48 and 49 are spaced a sufficient distance apart so that when the output speed of the variable speed drive 8 is correct, the contact 47 merely oscillates between contacts 48 and 49 without touching either. If, however, the output speed of 8 is too slow, the differential action of gears 30, 43 and 31 will eventually cause contact 47 to engage contact 48, thereby completing a circuit to motor 11 to cause it to shaft 24 in the proper direction to change the speed ratio in 8 to increase the output speed. If the output speed of 8 is too fast, contact 47 will engage contact 49 to cause motor 11 to run in the opposite direction, thereby decreasing the ratio in 8 and slowing its output speed. The result in either case is to bring the output speed of 8 to a value which coincides with the value represented by the time durations of the signals which energize solenoid 22. Referring to Fig. 1, it will be seen that changes in weight on scale 4 produce corresponding changes in the time durations of signals from transmitter 5, and then as described above, the differential speed controller 6 causes the variable speed drive 8 to feed material to scale 3 always in a desired proportion to that on scale 4.

To change the proportion between the weight on scale 3 to that on scale 4, it is merely necessary to change the relative position of disc 37 with roller 38 by means of adjusting screw 36. Moving the motor 32 and disc 37 to the left increases the speed of the roller 38. Assuming that no change in weight on scale 4 has occurred and therefore no change in signal durations to solenoid 22, contact 47 will be moved to engage contact 49, thereby running motor 11 to increase the output speed of 8. The result will be a faster feeding of material to scale 3 or in other words, a greater ratio between the weight on scale 3 to that on scale 4.

Moving the motor 32 and disc 37 to the right produces the opposite effect or a lesser ratio between the weight on scale 3 to that on scale 4.

The same controller apparatus 6 as above described may be employed in Fig. 2, and the rate of feed of material to the belt 1 of Fig. 2 may be governed by turning the screw 36 to obtain the desired relation between the disk 37 and roller 38. It will be understood, however, that in this case the wires 50 and 51 should be transposed at motor 11 so that the drive 8 will be caused to operate more slowly in response to longer signals to solenoid 22 and faster in response to shorter signals. Once the desired rate is set by screw 36, the units 8, 6, and 11 will thus automatically control the feeding to scale 3 to a definite weight per unit time. If a greater or less rate is desired, it is merely necessary to change the position of disc 37 by adjustment of screw 36. Moving disc 37 to the left increases the speed of roller 38, thereby causing contact 47 to engage contact 49 to cause motor 11 to decrease the output speed of unit 8 (the wires 50 and 51 being transposed with respect to their Figure 4 positions when applied to the embodiment in Fig. 2). Immediately the scale measures less weight and therefore transmitter 5 sends shorter signals to solenoid 22 until a balance between the speeds of gears 30 and 43 is reached. Similarly, moving disc 37 to the right produces the opposite effect or control at a greater rate.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a telemetric controller, means for delivering material at a variable rate, a member movable at a speed corresponding to said rate of delivery, means for transmitting cyclical signals of a duration corresponding to a quantity, means responsive to said signals, a member movable by said signal responsive means in a direction opposite to that of the first mentioned member through an extent in each cycle commensurate with the duration of the signal, contact means operable in each cycle through an extent and in a direction corresponding to the difference between the movement of the first mentioned member and the second mentioned member, and means controlled by said contact means for varying said rate of delivery.

2. In a telemetric controller, means for delivering material at a variable rate, a member movable at a speed corresponding to said rate of delivery, means for transmitting cyclical signals of a duration corresponding to a quantity, means responsive to said signals, a member movable by said signal responsive means in a direction opposite to that of the first mentioned member through an extent in each cycle commensurate with the duration of the signal, contact means operable in each cycle through an extent and in a direction corresponding to the difference between the movement of the first mentioned member and the second mentioned member, means controlled by said contact means for varying said rate of delivery, and means for varying the extent of movement of said second mentioned member for a signal of given duration.

3. In a telemetric control system, a continuously moving conveyor, means for continuously weighing material on said conveyor, means controlled by said weighing means for sending cyclical signals of a time duration corresponding to weight of material, motor means operable at substantially constant speed, a movable element, means responsive to said signals for connecting said element to said motor means for the duration of said signals, means continuously operable in accordance with the rate of delivery of a substance, and means jointly controlled by said element and the last mentioned continuously operable means for varying the rate of delivery of a substance.

RUDY P. LOWE.